UNITED STATES PATENT OFFICE.

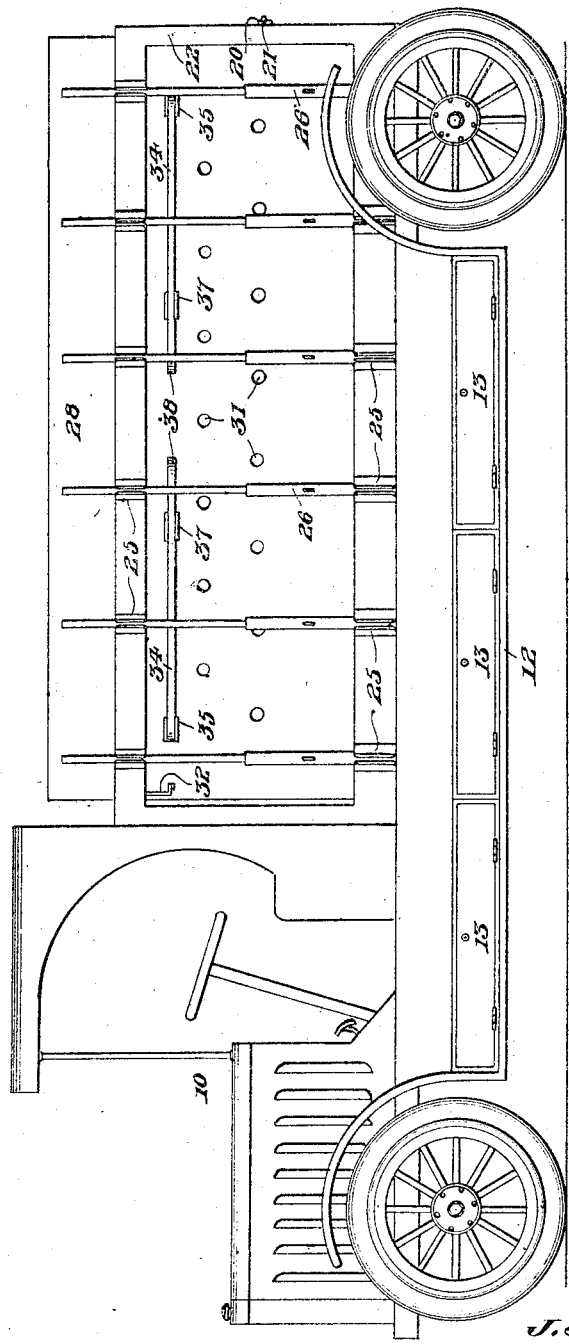

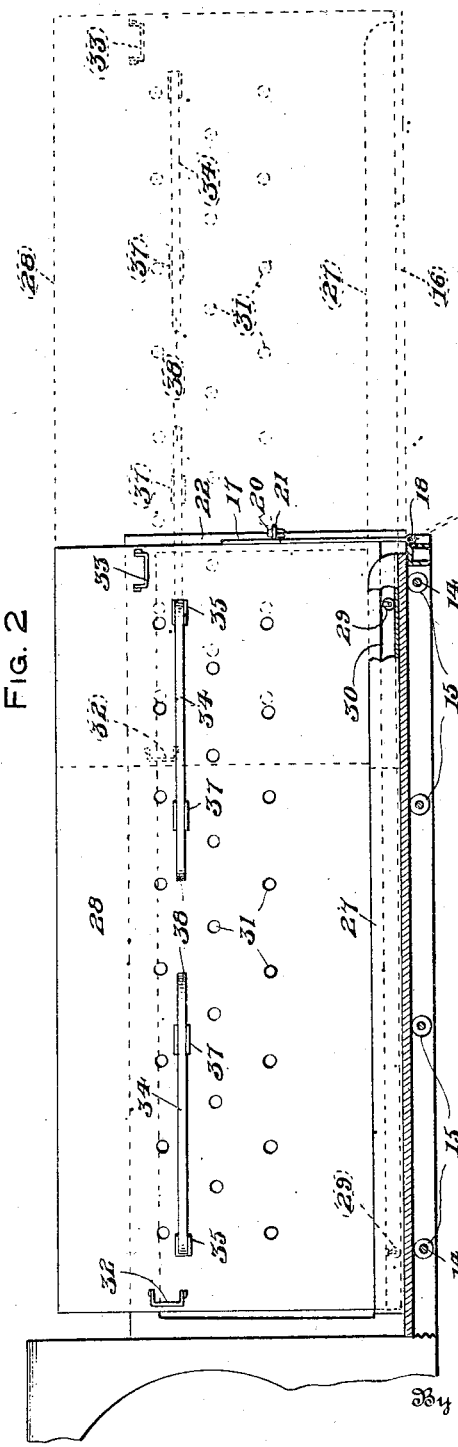
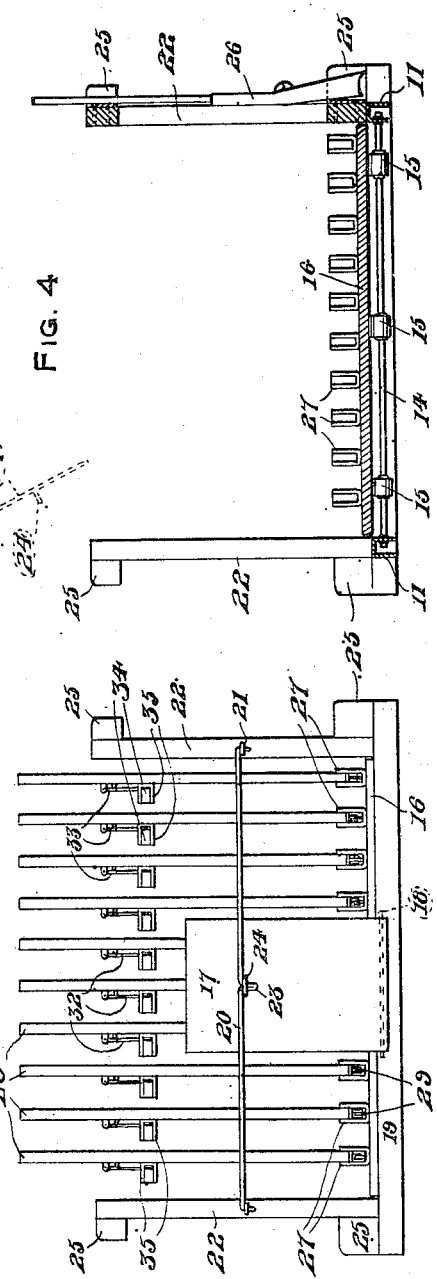

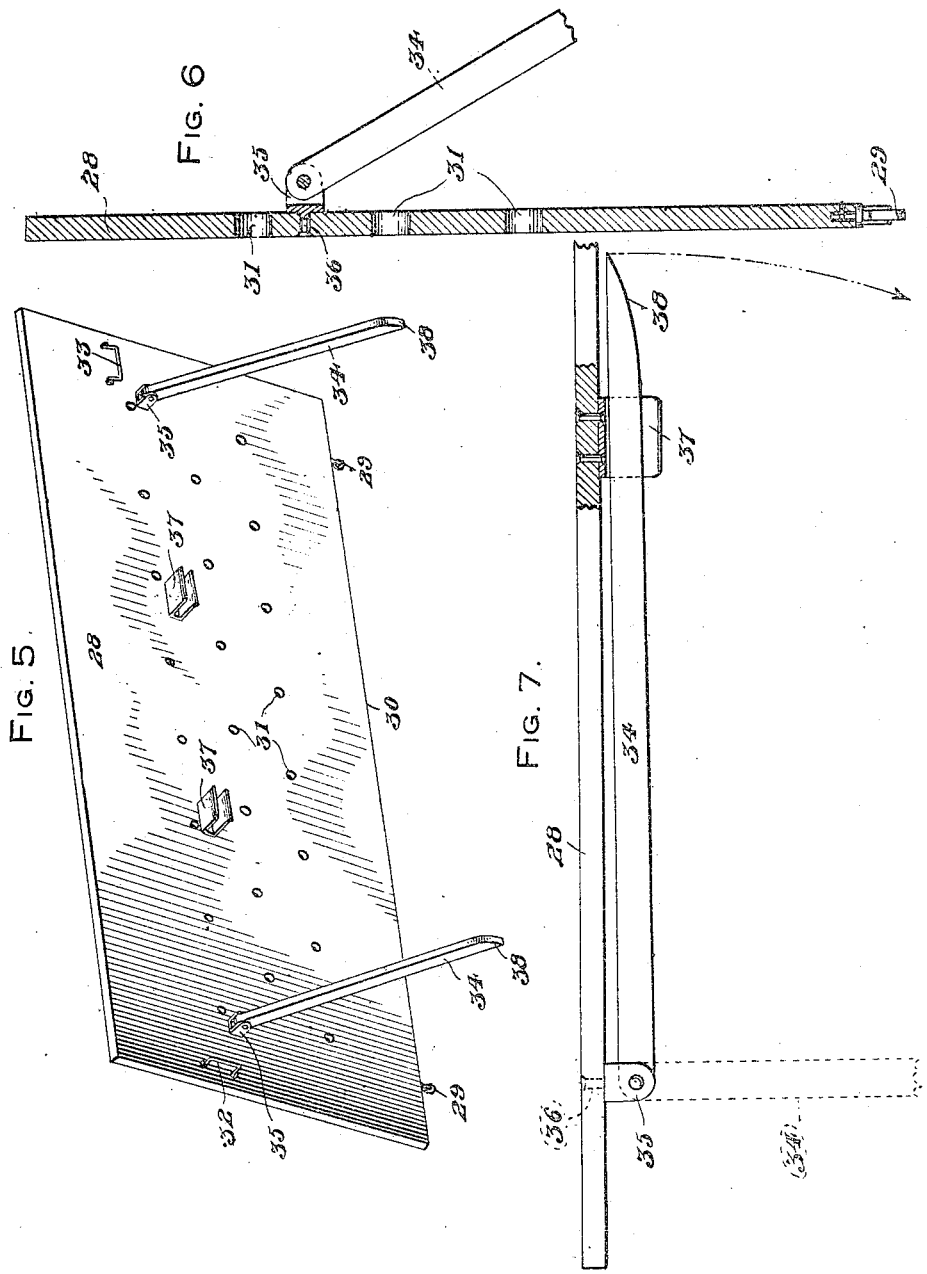

JOHN SACHAR, OF KATO, PENNSYLVANIA, ASSIGNOR OF ONE-HALF TO JACOB BROOKS, OF CLARENCE, PENNSYLVANIA.

TRANSPORTING-TRUCK FOR SOLDIER-PROTECTORS.

1,284,785.

Specification of Letters Patent. Patented Nov. 12, 1918.

Application filed July 20, 1918. Serial No. 245,826.

*To all whom it may concern:*

Be it known that I, JOHN SACHAR, a subject of the Emperor of Austria, residing at Kato, in the county of Center and State of Pennsylvania, have invented certain new and useful Improvements in Transporting-Trucks for Soldier-Protectors, of which the following is a specification.

The primary object of the invention is the provision of barriers for protecting soldiers and ready means for transporting the same to be set up for use wherever desired upon the battlefield.

A further object of the invention is the provision of a truck having a readily removable carrier for holding any desired number of soldier protectors or armor shields for transporting the same from place to place, provisions being also made for carrying rifles at suitably accessible points upon the truck.

With these general objects in view, the device consists of the novel combination and arrangement of parts hereinafter fully described and illustrated in the accompanying drawings in which like reference characters designate corresponding parts throughout the several views.

In the drawings,

Figure 1 is a side elevation of the device;

Fig. 2 is a vertical longitudinal sectional view through a portion of the same with parts broken away;

Fig. 3 is a rear elevation of the truck platform with the protectors mounted thereon;

Fig. 4 is a view of the same partly in transverse section with the protectors removed;

Fig. 5 is a perspective view of one of the protectors set up for use;

Fig. 6 is a transverse sectional view thereof; and

Fig. 7 is a top elevation of the same partially broken away.

My invention provides a truck 10 of substantially any ordinary motor type having a rectangular frame 11 formed of channel bars while the opposite running boards 12 of the truck have a plurality of tool boxes 13 mounted thereon.

Shafts 14 are positioned transversely of the frame 11 upon which a plurality of rollers 15 are journaled for slidably mounting a platform 16 adapted to be removed rearwardly from the frame 11 as indicated by dotted lines in Fig. 2 of the drawings. An end gate 17 is hinged as at 18 to the rear cross piece 19 of the frame 11 adapted to be retained in its vertical position by means of a rod 20 having its opposite ends hooked into eyes 21 carried by the rear ends of gun racks 22 at opposite sides of the frame 11. A centrally depending finger 23 of the rod 20 is positioned through an eye 24 carried by the gate 17 while the latter when elevated prevents the platform 16 from being slidably moved rearwardly. When the gate 17 is open, the platform 16 may be readily removed.

The racks 22 have resilient clips 25 for detachably holding rifles 26 positioned upright at the opposite sides of the truck 10. The said rifles are easily detached from the racks 22 for instant use by the soldiers when found desirable. A plurality of troughs 27 are longitudinally mounted upon the platform 16 in spaced relations adapted for the reception of the lower ends of rectangular protectors 28 in the form of armor plates having casters 29 upon their lower edges 30. The troughs 27 are of sufficient depth to maintain the protectors 28 positioned upright upon the platform 16 between the opposite gun racks 22 as best illustrated in Fig. 3 of the drawings, while as will be evident, the rear end gate 17 and its retaining rod 20 prevent any rearward movement of the protectors during transportation by the truck 10.

The protectors 28 are provided with rows of portholes 31 positioned therethrough and located at different elevations when the protector is set up for use at an inclination as illustrated in Fig. 5 of the drawings, suitable handles 32 and 33 being provided upon the protector for convenience in moving the same. Struts 34 are hinged upon the rear side of the protector 28 by means of brackets 35 provided for each strut and to which the strut is hinged, while said brackets are swiveled to the protector 28 by means of pins 36 as indicated in Fig. 6.

When the protectors 28 are positioned upon the platform 16, the struts 34 are swung upwardly and inwardly adjacent the rear side of the protector 28 into engagement with spring clips 37 which removably retain the struts in their inoperative positions.

The truck 10 transports the platform 16 with its protectors 28 to any desired point along the battle line and when the desired location is reached, the rod 20 is removed and the end gate 17 opened permitting the platform 16 to be slid rearwardly upon the rollers 15 and deposited upon the ground together with the protectors 28 mounted thereon. The protectors may be then grasped individually by means of the handles 32 and 33 and slidably removed from the troughs 27 and set up for use in inclined positions wherever desired. At such times, the casters 29 may be embedded or otherwise anchored in the earth if desired while the pointed free ends 38 of the struts 34 engage the earth rearwardly of the protector. Soldiers positioned rearwardly of the protectors 28 may fire upon the enemy through the portholes 31, the different horizontal rows of perforations being provided so that the firing may be accomplished when the soldiers are either lying upon the ground, kneeling or standing. The entire structure possesses great simplicity but also combines strength and utility, being serviceable in saving the lives of soldiers upon the battlefield, it being understood that the protectors 28 are formed of any suitable bullet-proof material, preventing missiles from passing therethrough to the injury of the soldiers positioned behind the protector.

What I claim as new is:—

1. In combination with a truck having a frame, a platform rearwardly removable from the frame, spaced troughs upon the platform adapted for holding protecting plates, and an end gate at the rear end of the truck adapted for upright positioning in the rearward path of travel of the platform.

2. In combination with a truck having a frame, transverse shafts carried by the frame, rollers journaled upon said shafts, a platform positioned upon said rollers removable rearwardly of the truck, an end gate for the truck hinged to said frame, and plate-holding means upon said platform.

3. In combination with a truck having a frame, transverse shafts carried by the frame, rollers journaled upon said shafts, a platform positioned upon said rollers removable rearwardly of the truck, an end gate for the truck hinged to said frame, longitudinal troughs upon said platform, protecting plates removably mounted upright in the said troughs, and a retaining rod removably positioned transversely of the truck at the rear end thereof in engagement with the said gate during the transportation of protectors by the truck.

4. A device of the class described comprising a truck having a frame, upright rifle racks at the opposite sides of the frame, rifle retaining clips outwardly carried by said racks, a removable platform upon the frame, holding troughs upon the platform, and a swinging end gate hinged to the frame and detachably connected to the rear ends of said racks when in its upright closed position.

In testimony whereof I affix my signature.

JOHN SACHAR.

Copies of this patent may be obtained for five cents each, by addressing the "Commissioner of Patents, Washington, D. C."